(12) United States Patent
Haberland

(10) Patent No.: US 9,948,124 B2
(45) Date of Patent: Apr. 17, 2018

(54) BATTERY CHARGING WITH DYNAMIC CURRENT LIMITING

(75) Inventor: Bernhard Lewis Haberland, Palm City, FL (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 812 days.

(21) Appl. No.: 14/343,394

(22) PCT Filed: Aug. 28, 2012

(86) PCT No.: PCT/IB2012/054405
§ 371 (c)(1),
(2), (4) Date: Mar. 7, 2014

(87) PCT Pub. No.: WO2013/038286
PCT Pub. Date: Mar. 21, 2013

(65) Prior Publication Data
US 2014/0210268 A1    Jul. 31, 2014

Related U.S. Application Data

(60) Provisional application No. 61/533,916, filed on Sep. 13, 2011.

(51) Int. Cl.
*H02J 3/14* (2006.01)
*H02J 7/00* (2006.01)
*H02J 7/04* (2006.01)

(52) U.S. Cl.
CPC ............ *H02J 7/007* (2013.01); *H02J 7/0072* (2013.01); *H02J 7/045* (2013.01); *Y10T 307/406* (2015.04)

(58) Field of Classification Search
CPC .......... H02J 7/007; H02J 7/045; H02J 7/0072; Y10T 307/406
USPC ........................................................ 307/31
See application file for complete search history.

(56) References Cited

U.S. PATENT DOCUMENTS

| 6,153,823 | A  | 11/2000 | Shiozaki |
| 6,229,286 | B1 | 5/2001  | Tokuyama |
| 6,288,522 | B1 | 9/2001  | Odaohhara |
| 7,525,291 | B1 | 4/2009  | Ferguson |
| 7,535,195 | B1 | 5/2009  | Horovitz |
| 7,746,036 | B2 | 6/2010  | Wolf |
| 7,782,017 | B2 | 8/2010  | Hack |
| 2004/0257839 | A1 | 12/2004 | Yang |
| 2006/0119320 | A1 | 6/2006  | Nork |
| 2006/0139002 | A1 | 6/2006  | Zemke |
| 2006/0267553 | A1 | 11/2006 | Chuang |

(Continued)

FOREIGN PATENT DOCUMENTS

| CN | 1806380 A   | 7/2006  |
| CN | 101079549 A | 11/2007 |

(Continued)

*Primary Examiner* — Richard Tan
(74) *Attorney, Agent, or Firm* — Michael W. Haas

(57) ABSTRACT

Systems and methods for dynamic current limiting control the charge current for charging a battery of a device by determining the difference between the maximum supply current of an external supply source and the device current of the device in operation as it varies over time. Accordingly, the battery may be charged faster, using a charge current that, combined with the device current of the device in operation, does not exceed the maximum supply current of the external supply source.

18 Claims, 3 Drawing Sheets

(56) References Cited

U.S. PATENT DOCUMENTS

| | | |
|---|---|---|
| 2007/0137487 A1 | 6/2007 | Whitley |
| 2007/0188139 A1* | 8/2007 | Hussain ................ H02J 7/0073 320/128 |
| 2008/0054855 A1 | 3/2008 | Hussain |
| 2010/0079114 A1 | 4/2010 | So |
| 2010/0244780 A1 | 9/2010 | Turner |

FOREIGN PATENT DOCUMENTS

| | | |
|---|---|---|
| EP | 0865086 A2 | 9/1998 |
| JP | 2000184612 A | 6/2000 |
| JP | 2000324713 A | 11/2000 |
| JP | 2000324715 | 11/2000 |

\* cited by examiner

BATTERY CHARGING WITH DYNAMIC CURRENT LIMITING

CROSS-REFERENCE TO RELATED APPLICATIONS

This patent application claims the priority benefit under 35 U.S.C. § 371 of international patent application no. PCT/IB2012/054405, filed Aug. 28, 2012, which claims the priority benefit under 35 U.S.C. § 119(e) of U.S. Provisional Application No. 61/533,196 filed on Sep. 13, 2011, the contents of which are herein incorporated by reference.

BACKGROUND OF THE INVENTION

1. Field of the Invention

The present disclosure pertains to systems and methods for charging a battery, and, in particular, to charging the battery of a device while the device is operating and drawing a varying device current.

2. Description of the Related Art

It is well known that electric and electronic devices may be powered by a rechargeable battery. It is well known that a power supply may be external to the device it powers and/or charges. It is well known that the battery of a device may be charged at the same time the device is operating. It is well known that the electrical power and/or current a device uses may vary over time and/or based on operating conditions of the device. It is well known that power supplies and other devices for charging a battery have a maximum supply current, and that a device or system should not draw more current than the maximum supply current.

SUMMARY OF THE INVENTION

Accordingly, it is an object of one or more embodiments of the present disclosure to provide a system configured to charge a battery of a device while the device is operating. The system includes an input connector configured to electrically couple the system with an external supply source, a device connector configured to electrically couple the system with a device to receive a device current, wherein the device draws power received through the device connector from the external supply source, a first sink circuit, a second sink circuit, a charge control circuit configured to control a charge current to charge a battery. The external supply source may supply a supply voltage and a supply current, and have a maximum supply current. The external supply source may be a separate and discrete device from the system. The device may draw a device current having an amount that varies with operating conditions of the device. The first sink circuit may be configured to draw a sink current from the supply current received through the input connector, wherein an amount of the sink current indicates an amount of the supply current received through the input connector from the external supply source. The second sink circuit may be configured to draw a bias current from the supply current received through the input connector, wherein an amount of the bias current indicates an amount of the maximum supply current of the external supply source. The charge control circuit may be configured to control a charge current to charge the battery from the supply current received through the input connector, wherein the amount of the charge current varies over time based on the sink current and the bias current such that the amount of the charge current combined with the varying amount of the device current of the device is maintained below the maximum supply current.

It is yet another aspect of one or more embodiments of the present disclosure to provide a method for charging a battery of a device while the device is operating. The method comprises electrically coupling a system configured to charge a battery with an external supply source to receive a supply voltage and a supply current from the external supply source, wherein the external supply source has a maximum supply current; electrically coupling the system configured to charge the battery with a device to receive a device current from the external supply source, wherein an amount of the device current varies with operating conditions of the device; automatically determining the supply current of the external supply source; determining the maximum supply current of the external supply source; automatically controlling a charge current received from the external supply source based on the determinations such that an amount of the charge current combined with the varying amount of the device current is maintained below the maximum supply current; and charging a battery with the controlled charge current.

It is yet another aspect of one or more embodiments to provide a system configured for charging a battery of a device while the device is operating. The system comprises means for electrically coupling a system configured to charge a battery with an external supply source to receive a supply voltage and a supply current from the external supply source, wherein the external supply source has a maximum supply current; means for electrically coupling a system configured to charge a battery with a device to receive a device current from the external supply source, wherein an amount of the device current varies with operating conditions of the device; means for automatically determining the supply current of the external supply source; means for determining the maximum supply current of the external supply source; means for automatically controlling a charge current received from the external supply source based on the determined supply current and the determined maximum supply current, such that an amount of the charge current combined with the varying amount of device current is maintained below the maximum supply current; and means for charging a battery with the controlled charge current.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals may designate corresponding parts in the various figures. It is to be expressly understood, however, that the drawings are for the purpose of illustration and description only and are not intended as a definition of any limits.

DETAILED DESCRIPTION OF EXEMPLARY EMBODIMENTS

Figure 1:
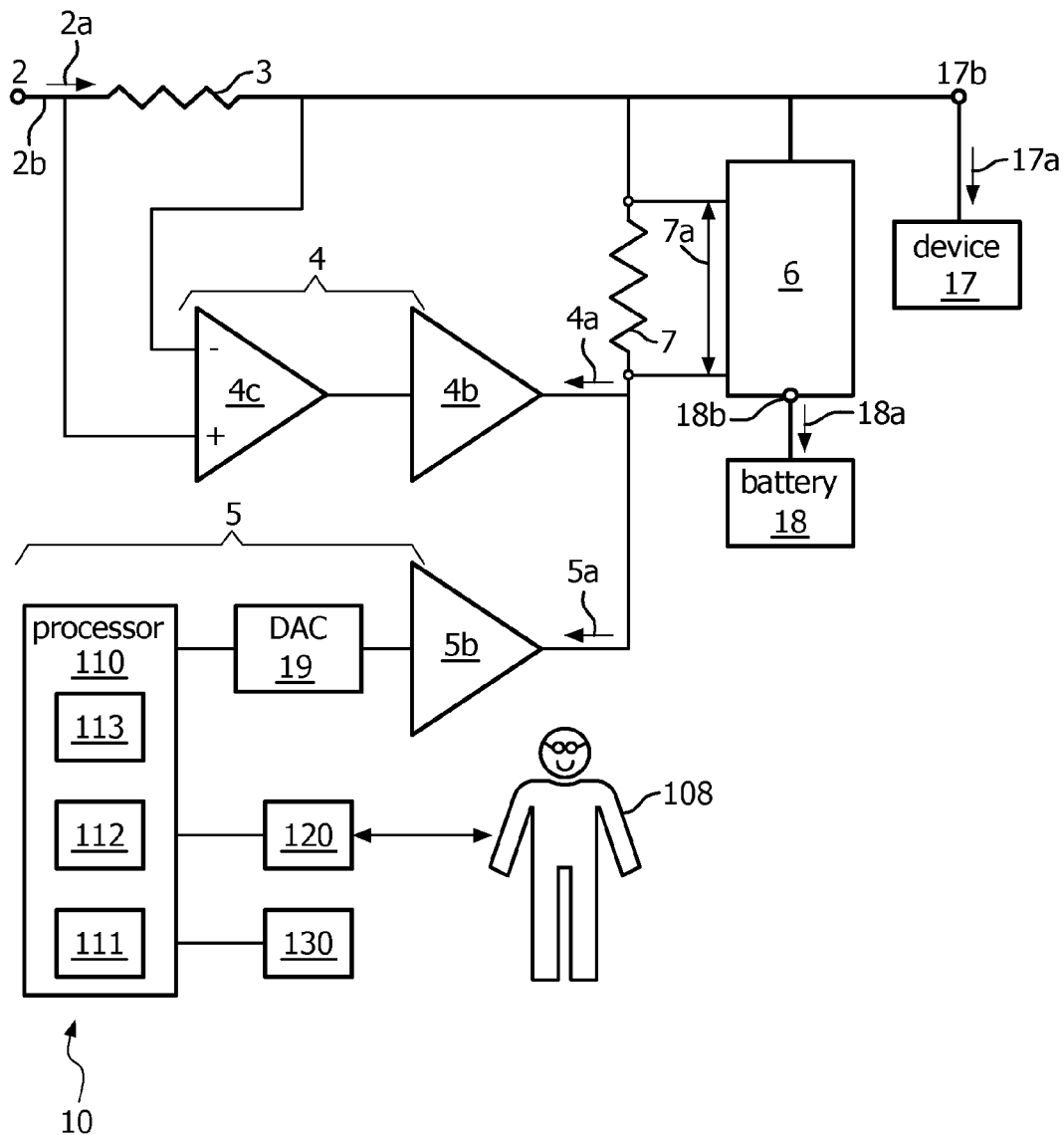
FIG. 1 schematically illustrates a system configured to charge a battery of a device while the device is operating.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

FIG. 1 schematically illustrates a system 10 configured to receive power from an external supply source, and to charge a battery 18 and/or power a device 17 with the received power. System 10 may be configured such that charging of battery 18 may be enhanced with respect to speed, efficiency, and/or other aspects by using available power from the external supply source that is not being used to power device 17 to charge battery 18. System 10 may include one or more of an input connector 2, a device connector 17b, a battery connector 18b, a first sink circuit 4, a second sink circuit 5, a charge control circuit 6, a sampling circuit 7, an identification circuit 113, a digital-to-analog converter 19, a processor 110, and/or other components.

System 10 may be electrically coupled to an external supply source to receive a supply voltage 2b and a supply current 2a through input connector 2. System 10 may be electrically coupled to a device to receive a device current 17a through device connector 17b. Device connector 17b may be a lead and/or may be integrated into, e.g., system 10. Device 17 may be configured to draw power received through input connector 2 from the external source supply. Device 17 may draw device current 17a from the external supply source, which may contribute to the amount of supply current 2a. Device current 17a may vary with operating conditions of device 17. The external supply source may have a maximum supply current. System 10 should not draw more current in total from the external supply source than the maximum supply current. The external supply source may be a separate and discrete device from system 10, though electrically connected through input connector 2.

Device 17 may for example be an oxygen concentrator, and/or another (medical) device. Note that the disclosure provided herein is not intended to be limited to one device, or one type of devices.

During operation of device 17, device current 17a may vary and/or change depending on the operating conditions of device 17. Alternatively, and/or simultaneously, device current 17a may vary periodically and/or according to unpredictable changes. For example, in some embodiments, device current 17a may vary according to a triangle wave (or sine wave, and/or any other shape wave or combination thereof) and may have a predetermined period, such that device current 17a is limited by an upper current limit and a lower current limit. The predetermined period, if present, may be 1 ms, 0.1 s, 1 s, 10 s, 1 minute, 10 minutes, and/or another predetermined period. The circuitry and/or components of system 10 used to charge battery 18 may not have control over and/or predictive knowledge of the exact amount of device current 17a that device 17 draws from the external supply source at any given moment during operation of device 17.

The maximum supply current of the external supply source minus the present device current 17a may equal the maximum theoretical amount of current that may be available to charge battery 18 simultaneously with operating device 17, assuming there is no other power supply other than the external supply source. The current used to charge battery 18 may be referred to as charge current 18a, which may contribute to the amount of supply current 2a. Battery connector 18b may be a lead and/or may be integrated into, e.g., system 10 and/or charge circuit 6. For example, battery 18 may be integrated in system 10. Alternatively, battery connector 18b may be a physical connector in embodiments where battery 18 is separate and discrete from the rest of system 10, i.e. not integrated in system 10. System 10 may be electrically coupled to battery 18 through battery connector 17b. Battery 18 may draw charge current 18a through battery connector 18b. In embodiments where an upper current limit for device 17 is present and known, a battery charging circuit may determine the difference of the maximum supply current of the external supply source and the upper current limit for device 17, and safely use the previously determined remaining amount of current as charge current 18a to charge battery 18. However, if the amount of the present device current 17a drops below the upper current limit, even if only temporarily, then merely using the previously determined remaining amount of current to charge battery 18 may not enhance efficiency.

System 10 may be designed to use all or nearly all of the maximum supply current from the external supply source while device current 17a dynamically varies by automatically determining the amount of charge current 18a. For example, this may be accomplished by the techniques described herein, and/or through other techniques.

First sink circuit 4 may be configured to draw a sink current 4a from supply current 2a (sink current 4a may be very small compared to supply current 2a), wherein the amount of sink current 4a may indicate the amount of supply current 2a of the external supply source. In some embodiments, first sink circuit 4 includes a current amplifier 4c having inputs that are electrically coupled to opposite sides of a circuit component 3 configured to establish a voltage difference, e.g. at or near input connector 2. For example, circuit component 3 may include a resistor with a small resistance, such as 10 mΩ, 100 mΩ, and/or another amount of resistance. The output voltage of current amplifier 4c may positively correlate to supply current 2a, e.g. proportionally. Current sink 4b may be electrically coupled to the output of current amplifier 4c, such that the amount of current that current sink 4b draws is positively correlated to the output voltage of current amplifier 4c, e.g. proportionally.

Second sink circuit 5 may be configured to draw a bias current 5a from supply current 2a (bias current 5a may be very small compared to supply current 2a), wherein the amount of bias current 5a may indicate the amount of the maximum supply current of the external supply source. The amount of sink current 5a that second sink circuit 5 draws, e.g. through bias control circuit 5b, may be negatively correlated to the maximum supply current of the external supply source, e.g. proportionally. In some embodiments, bias control circuit 5b may be a current sink, e.g. having a similar transfer function as current sink 4b. The maximum supply current may be detected, programmed, manually set, or obtained by other means. In some embodiments, the maximum supply current may be detected automatically through an identification circuit 113, a processor 110, a digital-to-analog converter 19, and/or other components, operating in conjunction with bias control circuit 5b.

Automatic determination/detection of the maximum supply current may depend on a characteristic circuit component within the external supply source. The characteristic circuit component may be a so-called ID resistor having a resistance that corresponds in a known manner to the maximum supply current. Known techniques and circuitry, referred to herein as identification circuit 113, may be used to "read" the characteristic circuit component, i.e. determine the resistance of the ID resistor. In some embodiments, an identification module 111, which may be an executable computer program module executed by processor 110, may be configured to identify the characteristic circuit component within the external supply source. Another executable program module, converter control module 112, may be configured to control DAC 19, based on the identified circuit component, such that DAC 19 controls bias control circuit 5b, and thus the amount of bias current 5a the second sink circuit draws.

First sink circuit 4 and second sink circuit 5 may be arranged to draw current through sampling circuit 7, which may be designed to establish a voltage difference. For example, sampling circuit 7 may include a resistor with a small resistance, such as 1Ω, 10Ω, and/or another amount of resistance. Sampling circuit 7 may be electrically coupled between supply voltage 2b and both first sink circuit 4 and second sink circuit 5, such that a voltage drop 7a across sampling circuit 7 may be based on the amount of sink current 5b and bias current 5a.

Charge control circuit 6 may be configured to control charge current 18a based on sink current 5a and bias current 4a (and/or based on voltage drop 7a as determined by sampling the voltage on opposite sides of sampling circuit 7), such that the amount of charge current 18a (varying over time) plus the varying amount of device current 17a is maintained below the maximum supply current of the external supply source. Charge control circuit 6 may typically not be able to change device current 17a or the maximum supply current. Charge control circuit 6 may be configured to control charge current 18a such that charge current 18a is adjusted until the sampled voltage drop 7a approximates a target voltage drop. In some embodiments, sampling circuit 7 comprises a 10Ω resistor and the target voltage drop is 100 mV, which corresponds to a target current of 10 mA through sampling circuit 7. Operating conditions in which the present charge current 18a is below the maximum theoretical amount of available charge current may correspond to a sampled voltage drop 7a below the target voltage drop.

Figure 2:
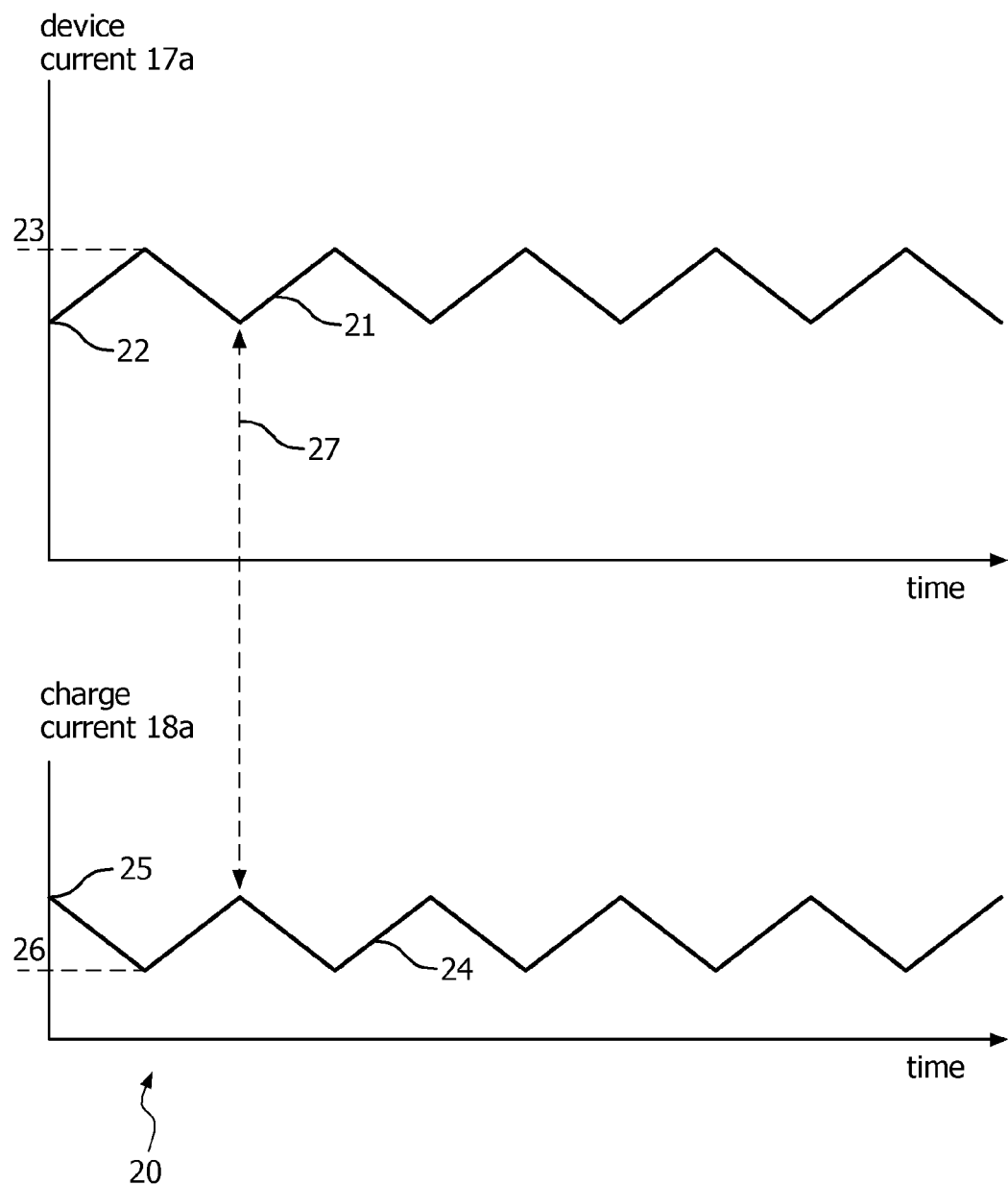
FIG. 2 illustrates a graph of the device current and the charge current varying over time.

By way of illustration, FIG. 2 illustrates a graph 20 of device current 17a and charge current 18a varying over time. An embodiment of a system similar to or the same as system 10 (shown in FIG. 1) that corresponds to graph 20 depicted in FIG. 2 may operate in conjunction with an external supply source that has a maximum supply current of 8 A. Device current 17a in FIG. 2 varies according to current function 21, which appears to be a triangular wave pattern with a predetermined period. The predetermined period may for example be 10 s, e.g. for an oxygen concentrator. Other periods are also contemplated, as are unpredictable current function and/or current functions without periodicity. Current function 21 starts at a lower current limit 22, which may represent, e.g., a current of 5 A. A half of the period later, current function 21 reaches upper current limit 23, which may represent, e.g., a current of 6.5 A. Another half of the period later, current function 21 again reaches the same level as lower current limit 22.

The embodiment of a system similar to or the same as system 10 (shown in FIG. 1) that corresponds to graph 20 depicted in FIG. 2 may include an identification circuit similar to or the same as identification circuit 113 (shown in FIG. 1), which may have identified a characteristic circuit component within an external supply source (similar to or the same as the external supply source described in relation to FIG. 1) that is known to correspond to a maximum supply current of 8 A. The embodiment of a system similar to or the same as system 10 (shown in FIG. 1) that corresponds to graph 20 may draw a supply current from the external supply source, wherein the supply current is similar to or the same as supply current 2a (shown in FIG. 1). Information pertaining to the maximum supply current may be used, e.g. by the identification module, to control a DAC similar to or the same as DAC 19 (shown in FIG. 1) such that a bias control circuit similar to or the same as bias control circuit 5b (shown in FIG. 1) draws a (relatively static) bias current of 2 mA. This bias current may generally be controlled according to the following formula:

$$\text{bias current} = 10 \text{ mA} - ((\text{maximum supply current})/1000).$$

In FIG. 2, when device current 17a is 5 A at lower current limit 22, the embodiment of a system similar to or the same as system 10 (shown in FIG. 1) that corresponds to graph 20 may draw a sink current similar to or the same as sink current 4a (shown in FIG. 1) of 5 mA. This assumes device current 17a comprises substantially all the current presently being drawn from the external supply source, and hence device current 17a being substantially equal to the supply current of the external supply source. The embodiment of a system similar to or the same as system 10 (shown in FIG. 1) that corresponds to graph 20 may include a sampling circuit similar to or the same as sampling circuit 7 (shown in FIG. 1). The current through the sampling circuit may thus be 7 mA, such that the voltage drop across the sampling circuit is 70 mV. The embodiment of a system similar to or the same as system 10 (shown in FIG. 1) that corresponds to graph 20 may include a charge control circuit similar to or the same as charge control circuit 6 (shown in FIG. 1). The embodiment of a system similar to or the same as system 10 (shown in FIG. 1) that corresponds to graph 20 may include a battery (similar to or the same as battery 18 shown in FIG. 1) arranged to be charged by charge current 18a, of graph 20, that is controlled by the charge control circuit.

The charge control circuit may increase charge current 18a that charges the battery until the voltage drop across the sampling circuit equals a target voltage drop of 100 mV, which occurs when charge current 18a is 3 A (indicated by upper current limit 25 of current function 24 in FIG. 2). At that moment, the supply current matches the maximum supply current of 8 A. Approximately half of the period of current function 21 later, device current 17a reaches 6.5 A. Meanwhile, the charge control circuit has adjusted charge current 18a down to 1.5 A (indicated by lower current limit 26 of current function 24 in FIG. 2), such that the voltage drop across the sampling circuit continues to match the target voltage drop of 100 mV, and the supply current continues to match the maximum supply current of 8 A. As shown in FIG. 2, the sum of device current 17a and charge current 18*a* is constant, and matches the maximum supply current, in this example 8 A. Marker 27 in FIG. 2 indicates that opposite extreme values of current function 21 and current function 24 occur at or near the same moment in time.

Note that the given amounts and/or values of currents, voltages, resistances, and/or other electrical characteristics of any components described herein are not intended to be limiting. It is to be understood that the given examples of operating conditions within system 10 are expected to function properly as described for a predetermined range of maximum supply currents. Systems and methods to charge batteries using external supply sources having a different range of maximum supply currents are within the scope of the described embodiments, and may be accommodated by adjusting certain component parameters of system 10, such as, e.g., the resistance of sampling circuit 7, the target voltage drop, etc.

Referring to FIG. 1, user interface 120 of system 10 in FIG. 1 may be configured to provide an interface between system 10 and a user (e.g., user 108) through which the user can provide information to and receive information from system 10. This enables data, results, and/or instructions and any other communicable items, collectively referred to as "information," to be communicated between the user and system 10. An example of information that may be conveyed to user 108 is information regarding the current external supply source being used to charge battery 18. Examples of interface devices suitable for inclusion in user interface 120 include a keypad, buttons, switches, a keyboard, knobs, levers, a display screen, a touch screen, speakers, a microphone, an indicator light, an audible alarm, and a printer. Information may be provided to user 108 by user interface 120 in the form of auditory signals, visual signals, tactile signals, and/or other sensory signals, or any combination thereof.

By way of non-limiting example, user interface 120 may include a radiation source capable of emitting light. The radiation source may include, for example, one or more of at least one LED, at least one light bulb, a display screen, and/or other sources. User interface 120 may control the radiation source to emit light in a manner that conveys to user 108 information related to the current level of supply current 2*a*.

It is to be understood that other communication techniques, either hard-wired or wireless, are also contemplated herein as user interface 120. For example, in one embodiment, user interface 120 may be integrated with a removable storage interface provided by electronic storage 130. In this example, information is loaded into system 10 from removable storage (e.g., a smart card, a flash drive, a removable disk, etc.) that enables the user(s) to customize the implementation of system 10. Other exemplary input devices and techniques adapted for use with system 10 as user interface 120 include, but are not limited to, an RS-232 port, RF link, an IR link, modem (telephone, cable, Ethernet, internet or other). In short, any technique for communicating information with system 10 is contemplated as user interface 120.

Electronic storage 130 of system 10 in FIG. 1 comprises electronic storage media that electronically stores information. The electronic storage media of electronic storage 130 may include one or both of system storage that is provided integrally (i.e., substantially non-removable) with system 10 and/or removable storage that is removably connectable to system 10 via, for example, a port (e.g., a USB port, a FireWire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 130 may store software algorithms, information determined by processor 110, information received via user interface 120, and/or other information that enables system 10 to function properly. For example, electronic storage 130 may record or store one or more measurements of current levels such as supply current 2*a* and/or charge current 18*a* (as discussed elsewhere herein), and/or other information. Electronic storage 130 may be a separate component within system 10, or electronic storage 130 may be provided integrally with one or more other components of system 10 (e.g., processor 110).

Processor 110 of system 10 in FIG. 1 is configured to provide information processing capabilities in system 10. As such, processor 110 includes one or more of a digital processor, an analog processor, a digital circuit designed to process information, an analog circuit designed to process information, a state machine, and/or other mechanisms for electronically processing information. Although processor 110 is shown in FIG. 1 as a single entity, this is for illustrative purposes only. In some implementations, processor 110 includes a plurality of processing units.

As is shown in FIG. 1, processor 110 is configured to execute one or more computer program modules. The one or more computer program modules include one or more of an identification module 111, a converter control module 112, and/or other modules. Processor 110 may be configured to execute modules 111 and/or 112 by software; hardware; firmware; some combination of software, hardware, and/or firmware; and/or other mechanisms for configuring processing capabilities on processor 110.

It should be appreciated that although modules 111 and 112 are illustrated in FIG. 1 as being co-located within a single processing unit, in implementations in which processor 110 includes multiple processing units, one or more of modules 111 and/or 112 may be located remotely from the other modules. The description of the functionality provided by the different modules 111 and/or 112 described below is for illustrative purposes, and is not intended to be limiting, as any of modules 111 and/or 112 may provide more or less functionality than is described. For example, one or more of modules 111 and/or 112 may be eliminated, and some or all of its functionality may be provided by other ones of modules 111 and/or 112. Note that processor 110 may be configured to execute one or more additional modules that may perform some or all of the functionality attributed below to one of modules 111 and/or 112.

Identification module 111 of system 10 in FIG. 1 may be configured to identify a circuit component within the external supply source. This circuit component may be a characteristic circuit component, such as a resistor with a particular resistance, which may correspond in a known manner to the maximum supply current of the external supply source. Information pertaining to the maximum supply current may be used by other modules, and/or other components of system 10.

Converter control module 112 of system 10 in FIG. 1 may be configured to control DAC 19, e.g. based on the identified circuit component by identification module 111, such that DAC 19 controls bias control circuit 5*b*, and thus the amount of bias current 5*a* that second sink circuit 5 draws.

Figure 3:
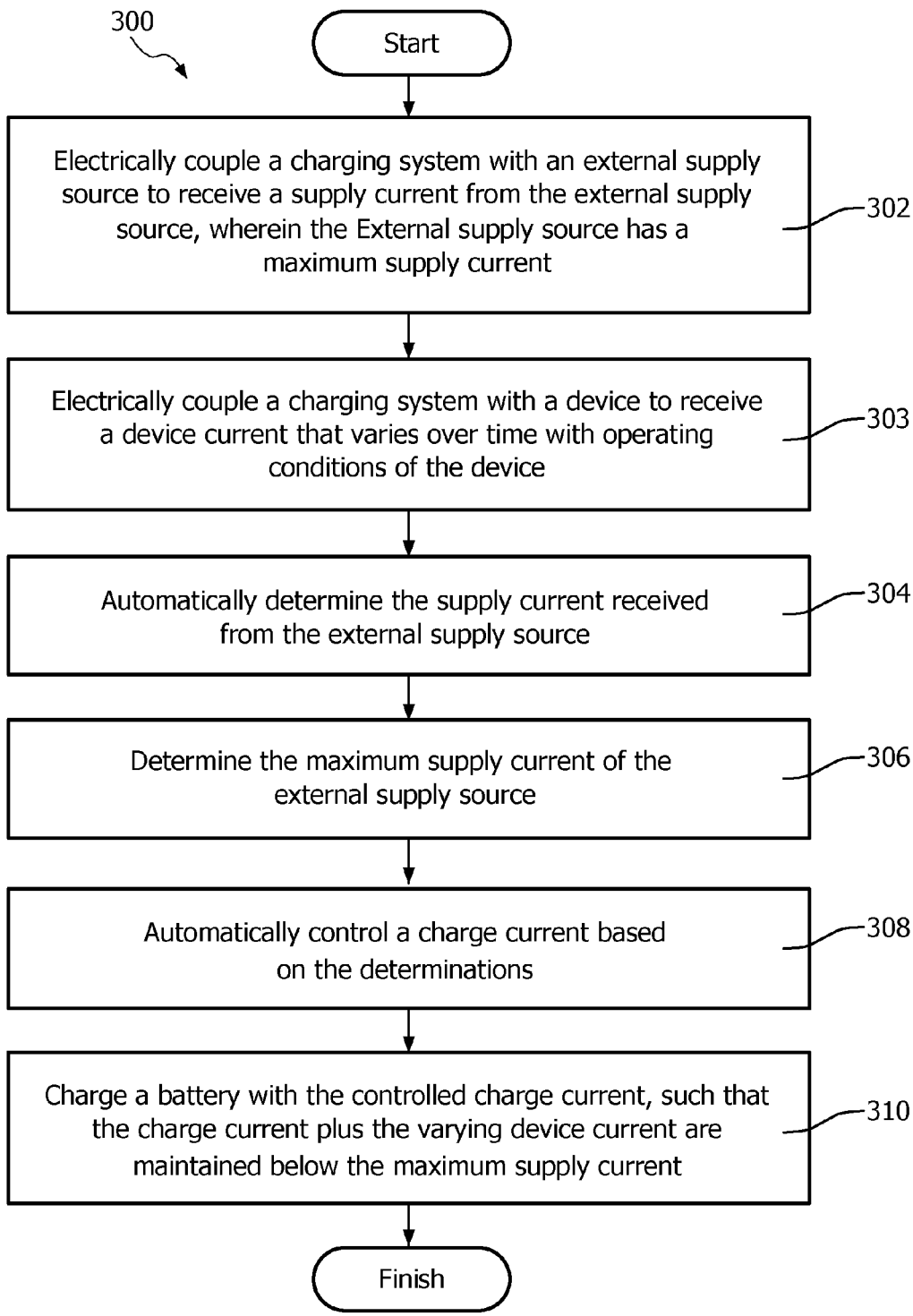
FIG. 3 illustrates a method for charging a battery of a device while the device is operating.

FIG. 3 illustrates a method 300 for charging battery 18 while device 17 is operating. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a system configured to charge a battery is electrically coupled with an external supply source. In one embodiment, operation 302 is performed by a connector similar to or substantially the same as input connector 2 (shown in FIG. 1 and described above).

At an operation 303, the system configured to charge the battery is electrically coupled with a device to receive a device current that varies over time with operating conditions of the device. In one embodiment, operation 303 is performed by a device connector similar to or substantially the same as device connector 17b (shown in FIG. 1 and described above).

At an operation 304, the supply current received from the external supply source is automatically determined. In one embodiment, operation 304 is performed by a sink circuit similar to or substantially the same as first sink circuit 4 (shown in FIG. 1 and described above).

At an operation 306, the maximum supply current of the external supply source is determined. In one embodiment, operation 306 is performed by a sink circuit similar to or substantially the same as second sink circuit 5 (shown in FIG. 1 and described above).

At an operation 308, a charge current is automatically controlled based on the determinations of the supply current and the maximum supply current. In one embodiment, operation 308 is performed by a charge control circuit similar to or substantially the same as charge control circuit 6 (shown in FIG. 1 and described above).

At an operation 310, a battery is charged with the controlled charge current, such that the charge current plus the varying device current are maintained below the maximum supply current. In one embodiment, operation 310 is performed by a charge control circuit similar to or substantially the same as charge control circuit 6 (shown in FIG. 1 and described above).

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system configured to charge a battery of a device while the device is operating, the system comprising:
    an input connector configured to electrically couple the system with an external supply source to receive a supply voltage and a supply current, wherein the external supply source has a maximum supply current, and wherein the external supply source is a separate and discrete device from the system;
    a device connector configured to electrically couple the system with the device to receive a device current, wherein the device draws power received through the device connector from the external supply source, wherein the device current has an amount that varies over time with operating conditions of the device;
    a first sink circuit configured to draw a sink current from the supply current received through the input connector, wherein first sink circuit is configured such that an amount of the sink current indicates an amount of the supply current of the external supply source received through the input connector;
    a second sink circuit configured to draw a bias current from the supply current received through the input connector, wherein the second sink circuit is configured such that an amount of the bias current indicates an amount of the maximum supply current of the external supply source;
    a sampling circuit that is electrically coupled with the first sink circuit and the second sink circuit, such that a voltage drop across the sampling circuit is based on the sink current and the bias current; and
    a charge control circuit configured to sample the voltage drop across the sampling circuit and to control a charge current to charge a battery from the supply current based on the sampled voltage drop, the charge current being received through the input connector, wherein the charge control circuit is configured such that an amount of the charge current combined with the varying amount of the device current of the device is maintained below the maximum supply current; wherein the system is configured to simultaneously power the battery and the device.

2. The system claim 1, wherein the first sink circuit is further configured to draw current through the sampling circuit.

3. The system of claim 1, wherein the second sink circuit comprises:
    an identification circuit configured to identify a circuit component of the external supply source, wherein the circuit component corresponds to the maximum supply current; and
    a bias control circuit configured to set the bias current based on the maximum supply current.

4. A system configured to charge a battery of a device while the device is operating, the system comprising:
an input connector configured to electrically couple the system with an external supply source to receive a supply voltage and a supply current, wherein the external supply source has a maximum supply current, and wherein the external supply source is a separate and discrete device from the system;
a device connector configured to electrically couple the system with the device to receive a device current, wherein the device draws power received through the device connector from the external supply source, wherein the device current has an amount that varies over time with operating conditions of the device;
a first sink circuit configured to draw a sink current from the supply current received through the input connector, wherein first sink circuit is configured such that an amount of the sink current indicates an amount of the supply current of the external supply source received through the input connector;
a second sink circuit configured to draw a bias current from the supply current received through the input connector, wherein the second sink circuit is configured such that an amount of the bias current indicates an amount of the maximum supply current of the external supply source;
a sampling circuit that is electrically coupled with the first sink circuit and the second sink circuit, such that a voltage drop across the sampling circuit is based on the sink current and the bias current;
a charge control circuit configured to sample the voltage drop across the sampling circuit and to control a charge current to charge a battery from the supply current based on the sampled voltage drop, the charge current being received through the input connector, wherein the charge control circuit is configured such that an amount of the charge current combined with the varying amount of the device current of the device is maintained below the maximum supply current;
wherein the second sink circuit comprises:
a current sink configured to draw the bias current;
a digital-to-analog (DAC) converter configured to control the current sink; and
one or more processors configured to execute computer program modules, the computer program modules comprising:
an identification module configured to identify a circuit component of the external supply source, wherein the circuit component corresponds to the maximum supply current; and
a converter control module configured to control the (DAC) converter based on the identified circuit component.

5. The system of claim 1, wherein the charge control circuit is configured to control the charge current such that the charge current is adjusted until the sampled voltage drop approximates a target voltage drop.

6. A method for charging a battery of a device while the device is operating, the method comprising:
electrically coupling, with an input connector, a system configured to charge a battery with an external supply source to receive a supply voltage and a supply current from the external supply source, wherein the external supply source has a maximum supply current;
electrically coupling, with a device connector, the system configured to charge the battery with the device to receive a device current from the external supply source, wherein an amount of the device current varies with operating conditions of the device;
drawing, with a first sink circuit, a sink current from the supply current to automatically determine the supply current received from the external supply source;
drawing, with a second sink circuit, a bias current from the supply current to determine the maximum supply current of the external supply source;
electrically coupling a sampling circuit with the first sink circuit and the second sink circuit, such that a voltage drop across the sampling circuit is based on the sink current and the bias current;
sampling, with a sampling circuit, the voltage drop across the sampling circuit;
automatically controlling, with a charge control circuit, a charge current received from the external supply source based on the sampled voltage drop such that an amount of the charge current combined with the varying amount of the device current is maintained below the maximum supply current; and
charging the battery with the controlled charge current; wherein the system is configured to simultaneously power the battery and the device.

7. The method of claim 6, wherein an amount of the sink current is based on an amount of the supply current of the external supply source and wherein an amount of the bias current is based on an amount of the maximum supply current of the external supply source.

8. The method of claim 6, wherein automatically determining the supply current received from the external supply source includes drawing current through the sampling circuit.

9. The method of claim 6, wherein the determining the maximum supply current comprises:
identifying a circuit component of the external supply source, wherein the circuit component corresponds to the maximum supply current; and
setting the bias current inversely proportional to the maximum supply current.

10. The method of claim 6, wherein controlling the charge current based on the sampled voltage drop comprises adjusting the charge current until the sampled voltage drop approximates a target voltage drop.

11. A system configured for charging a battery of a device while the device is operating, the system comprising:
means for electrically coupling the system configured to charge the battery with an external supply source to receive a supply voltage and a supply current from the external supply source, wherein the external supply source has a maximum supply current;
means for electrically coupling a system configured to charge a battery with the device to receive a device current from the external supply source, wherein an amount of the device current varies with operating conditions of the device;
means for drawing a sink current from the supply current to automatically determine the supply current received from the external supply source;
means for drawing a bias current from the supply current to determine the maximum supply current of the external supply source;
means for establishing a voltage difference, wherein the means for establishing the voltage difference is electrically coupled with the means for drawing the sink current-and the means for drawing the bias current, such that the voltage difference is based on the sink current and the bias current;

means for sampling the voltage drop across the means for establishing the voltage difference;

means for automatically controlling a charge current received from the external supply source based on the sampled voltage drop such that an amount of the charge current combined with the varying amount of device current is maintained below the maximum supply current; and means for charging a battery with the controlled charge current; wherein the system is configured to simultaneously power the battery and the device.

12. The system of claim 11, wherein an amount of the sink current is based on an amount of the supply current of the external supply source and wherein an amount of the bias current is based on an amount of the maximum supply current of the external supply source.

13. The system of claim 11, wherein the means for drawing the bias current is further configured to draw current through the means for establishing the voltage difference.

14. The system of claim 11, wherein the means for determining the maximum supply current comprises:

means for identifying a circuit component of the external supply source, wherein the circuit component corresponds to the maximum supply current; and means for setting the bias current inversely proportional to the maximum supply current.

15. The system of claim 11, wherein the means for controlling the charge current is configured to adjust the charge current until the sampled voltage drop approximates a target voltage drop.

16. The system of claim 1, wherein the charge control circuit and the device are connected in parallel.

17. The method of claim 6, wherein the charge control circuit and the device are connected in parallel.

18. The system of claim 11, wherein the means for automatically controlling the charge current and the device are connected in parallel.

* * * * *